(12) United States Patent
Tahara

(10) Patent No.: US 7,377,121 B2
(45) Date of Patent: May 27, 2008

(54) VEHICLE AIR CONDITIONER

(75) Inventor: Toshihiro Tahara, Nagoya (JP)

(73) Assignee: Denso Corporation, Kariya (JP)

( * ) Notice: Subject to any disclaimer, the term of this patent is extended or adjusted under 35 U.S.C. 154(b) by 316 days.

(21) Appl. No.: 11/224,715

(22) Filed: Sep. 12, 2005

(65) Prior Publication Data

US 2006/0053813 A1    Mar. 16, 2006

(30) Foreign Application Priority Data

Sep. 16, 2004    (JP)    ............................. 2004-270057

(51) Int. Cl.
*B60H 1/32* (2006.01)
(52) U.S. Cl. ........................... 62/244; 165/42; 454/156
(58) Field of Classification Search ................... 62/244; 165/42–43; 454/126, 156, 159
See application file for complete search history.

(56) References Cited

U.S. PATENT DOCUMENTS

| | | | |
|---|---|---|---|
| 5,755,107 A * | 5/1998 | Shirota et al. | ................. 62/244 |
| 6,044,656 A * | 4/2000 | Shirota et al. | ................. 62/244 |
| 6,351,961 B1 * | 3/2002 | Kurokawa et al. | ............. 62/244 |
| 6,478,083 B1 * | 11/2002 | Nanba et al. | ................ 165/202 |
| 6,651,453 B2 * | 11/2003 | Klingler et al. | ................ 62/244 |
| 6,743,090 B2 * | 6/2004 | Nagata et al. | ............... 454/156 |
| 6,918,262 B2 * | 7/2005 | Kamiya et al. | ................ 62/244 |

FOREIGN PATENT DOCUMENTS

| JP | 2001-213142 | 8/2001 |
|---|---|---|
| JP | 2003-63230 | 3/2003 |

OTHER PUBLICATIONS

Office Action dated Jun. 15, 2007 in Chinese Application No. 2005 1010 3967.3 with English translation.

* cited by examiner

*Primary Examiner*—William E Tapolcai
(74) *Attorney, Agent, or Firm*—Harness, Dickey & Pierce, PLC

(57) ABSTRACT

A vehicle air conditioner includes an air conditioning case having an air introducing port from which air is introduced in an air introducing direction from a side of a cooling heat exchanger to a space under the cooling heat exchanger. Further, the air conditioning case includes a flow turning portion by which air introduced from the air introducing port is turned and flows through the cooling heat exchanger upwardly, and the cooling heat exchanger is slanted to have an upper end portion and a lower end portion approximately parallel to the air introducing direction. Furthermore, a plate member is arranged in the air conditioning case at a position under the lower end portion of the cooling heat exchanger, and the plate member has a plate surface which crosses with the air introducing direction to reduce a flow speed of air.

12 Claims, 3 Drawing Sheets

VEHICLE AIR CONDITIONER

CROSS REFERENCE TO RELATED APPLICATION

This application is based on Japanese Patent Application No. 2004-270057 filed on Sep. 16, 2004, the contents of which are incorporated herein by reference in its entirety.

FIELD OF THE INVENTION

The present invention relates to a vehicle air conditioner having a cooling heat exchanger which is arranged in an air conditioning case to be slanted.

BACKGROUND OF THE INVENTION

A vehicle air conditioner generally includes an air conditioning case having air outlet ports and doors, and a cooling heat exchanger arranged in the air conditioning case. Moisture contained in air flowing in the air conditioning case is condensed on the surface of the cooling heat exchanger (i.e., evaporator), and condensed water is generated. The condensed water is discharged to an exterior of the air conditioning case from a drain port that is provided at a bottom wall portion of the air conditioning case.

Recently, a blower having a large air-blowing capacity is used for sufficiently performing air-conditioning operation in a large space of a passenger compartment of a vehicle. However, when the blower capable of generating a large air-blowing capacity is simply used for a vehicle air conditioner having a slanted evaporator (e.g., JP-A-2003-63230), the condensed water collected to a lower end portion of the cooling heat exchanger is spattered by a large flow rate of air blown from the blower.

In the vehicle air conditioner of JP-A-2003-63230, because the air from the blower is sent to the evaporator from a side, the air from the blower crosses with the slanted direction of the evaporator by a high flow rate. In this case, condensed water may be mixed into the air to be blown into the passenger compartment.

SUMMARY OF THE INVENTION

In view of the above-described problems, it is an object of the present invention to provide a vehicle air conditioner having a slanted cooling heat exchanger, which prevents condensed water collected at a lower end portion of the cooling heat exchanger from flying due to a large air flow.

According to an aspect of the present invention, a vehicle air conditioner includes a cooling heat exchanger which cools air passing therethrough, and an air conditioning case in which the cooling heat exchanger is arranged to be slanted. The air conditioning case has an air introducing port from which air is introduced in an air introducing direction from a side of the cooling heat exchanger to a space under the cooling heat exchanger. The air conditioning case further includes a flow turning portion by which air introduced from the air introducing port into the space under the cooling heat exchanger is turned and flows through the cooling heat exchanger upwardly, and the cooling heat exchanger is slanted to have an upper end portion and a lower end portion approximately parallel to the air introducing direction. Furthermore, a plate member is arranged in the air conditioning case at a position under the lower end portion of the cooling heat exchanger, and the plate member has a plate surface, which crosses with the air introducing direction to reduce a flow speed of air. Therefore, even when an air blowing amount from a blower is larger, it can restrict condensed water generated on the cooling heat exchanger from being scattered and the condensed water from being mixed into air to be blown into a passenger compartment of the vehicle.

For example, the plate surface of the plate member is approximately perpendicular to the air introducing direction.

Further, a drain port portion can be provided in a bottom wall portion of the air conditioning case, through which condensed water generated on the cooling heat exchanger is discharged to an exterior of the air conditioning case. Furthermore, the air conditioning case can be provided with a guide portion, through which the condensed water collected at the lower end portion of the cooling heat exchanger is guided to the drain port portion. In addition, the guide portion can be constructed with a protruding portion protruding from the bottom wall portion of the air conditioning case and integrated with the plate member, and a contact portion having a first end engaged with the protruding portion and a second end contacting a bottom surface of the lower end portion of the cooling heat exchanger. In this case, the condensed water can be easily discharged to an exterior of the air conditioning case without being collected to the lower end portion of the cooling heat exchanger.

The protruding portion can be arranged to extend in a direction parallel to the air introducing direction. Further, the plate member can be constructed with a plurality of ribs having at least an upstream rib and a downstream rib positioned downstream of the upstream rib in the air introducing direction. In this case, the upstream rib can be arranged to have a low flow resistance as compared with the downstream rib.

For example, the upstream rib is slanted toward downstream in the air introducing direction, and the downstream rib protrudes approximately perpendicular to the air introducing direction.

The cooling heat exchanger can be arranged in the air conditioning case such that a flow speed of air flowing upward in the cooling heat exchanger is higher at the lower end portion, as compared with the upper end portion of the cooling heat exchanger. Furthermore, the plate member can be formed integrally with the bottom wall portion of the air conditioning case.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF PREFERRED EMBODIMENTS

A preferred embodiment of the present invention will be now described with reference to FIGS. 1-4.

A vehicle air conditioner includes an air conditioning case 10 for forming an air passage through which air flows into a passenger compartment. The air conditioning case 10 is constructed with an upper case part 11 shown in FIG. 1, and a lower case part 35 shown in FIGS. 1 and 2.

Figure 1:
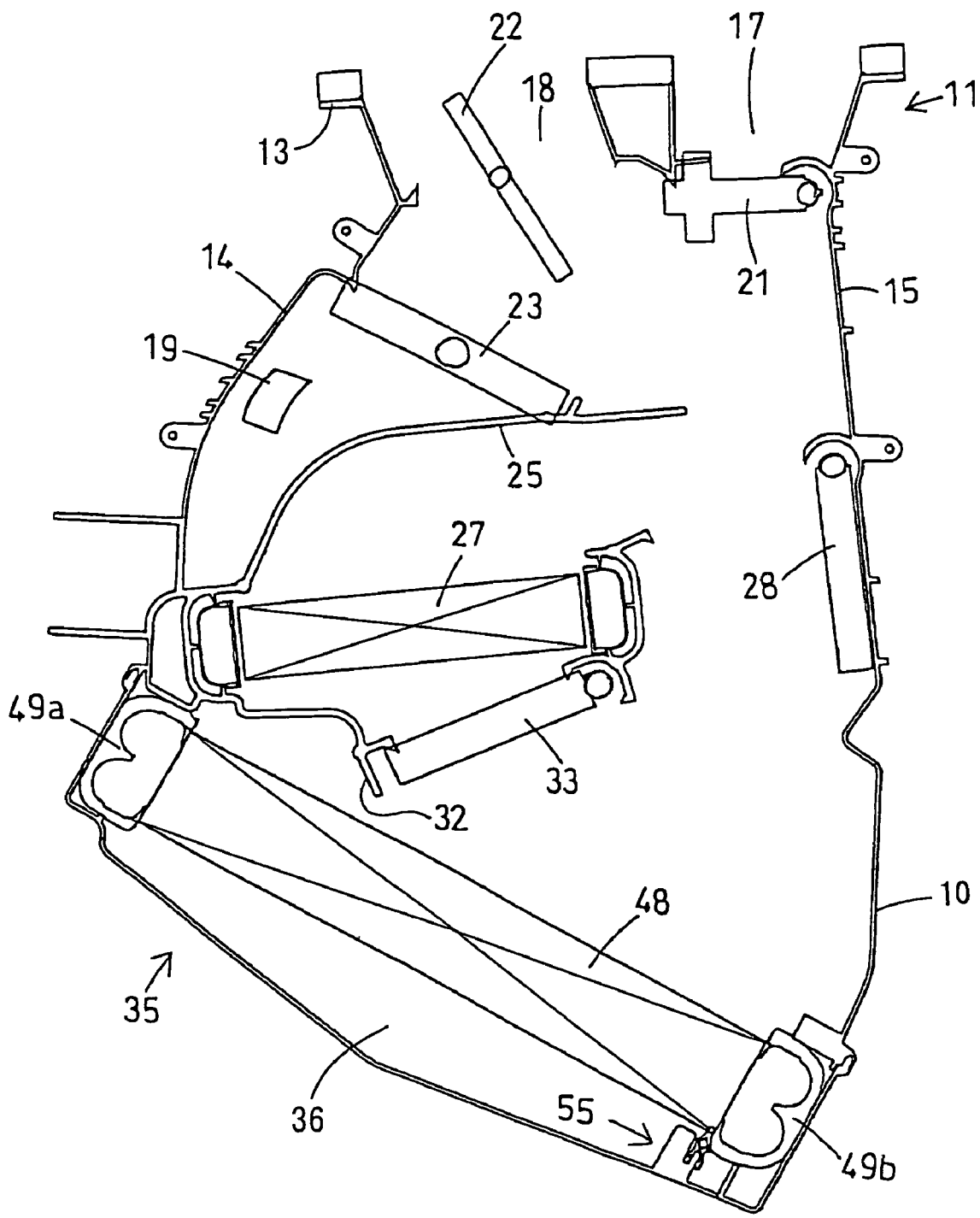
FIG. 1 is a schematic sectional view showing a vehicle air conditioner according to a preferred embodiment of the present invention.

The upper case part 11 includes an upper wall portion 13, a pair of side wall portions 14, 15, and a pair of front and back wall portions (not shown in FIG. 1). The upper case part 11 is made of resin, and its lower end is opened. A defroster opening 17 through which air flows toward an inner surface of a windshield, and a face opening 18 through which air flows toward an upper portion in the passenger compartment are formed in the upper wall portion 13. A foot opening 19 through which air flows toward a lower portion in the passenger compartment is formed in the side wall portion 14.

A defroster door 21 is rotatably supported in the upper case part 11 to open and close the defroster opening 17, and a face door 22 is rotatably supported in the upper case part 11 to open and close the face opening 18. Furthermore, a foot door 23 is rotatably supported in the upper case part 11 at a position between the side wall 14 and a partition wall 25, to open and close the foot opening 19.

An evaporator 48 for cooling air is located in the lower case part 35 to be slanted downwardly. A heater core 27 for heating air is located in the upper case part 11 approximately horizontally adjacent to the lower end of the upper case part 11. The heater core 27 is positioned adjacent to the side wall 14 so that a space is formed between the heater core 27 and the side wall 15. An auxiliary air mixing door 28 is disposed in the space between the heater core 27 and the side wall 15 to open and close the space therebetween. One end of an air mixing door 33 is rotatably supported in the upper case part 11 at an upstream air side of the heater core 27. Specifically, a partition wall 32 is located at an upstream air side of the heater core 27 as shown in FIG. 1, and the air mixing door 33 is rotatably supported at a position between the heater core 27 and the partition wall 32. The heater core 27 heats air passing therethrough using a thermal medium (e.g., engine-cooling water) as a heating source.

Figure 2:
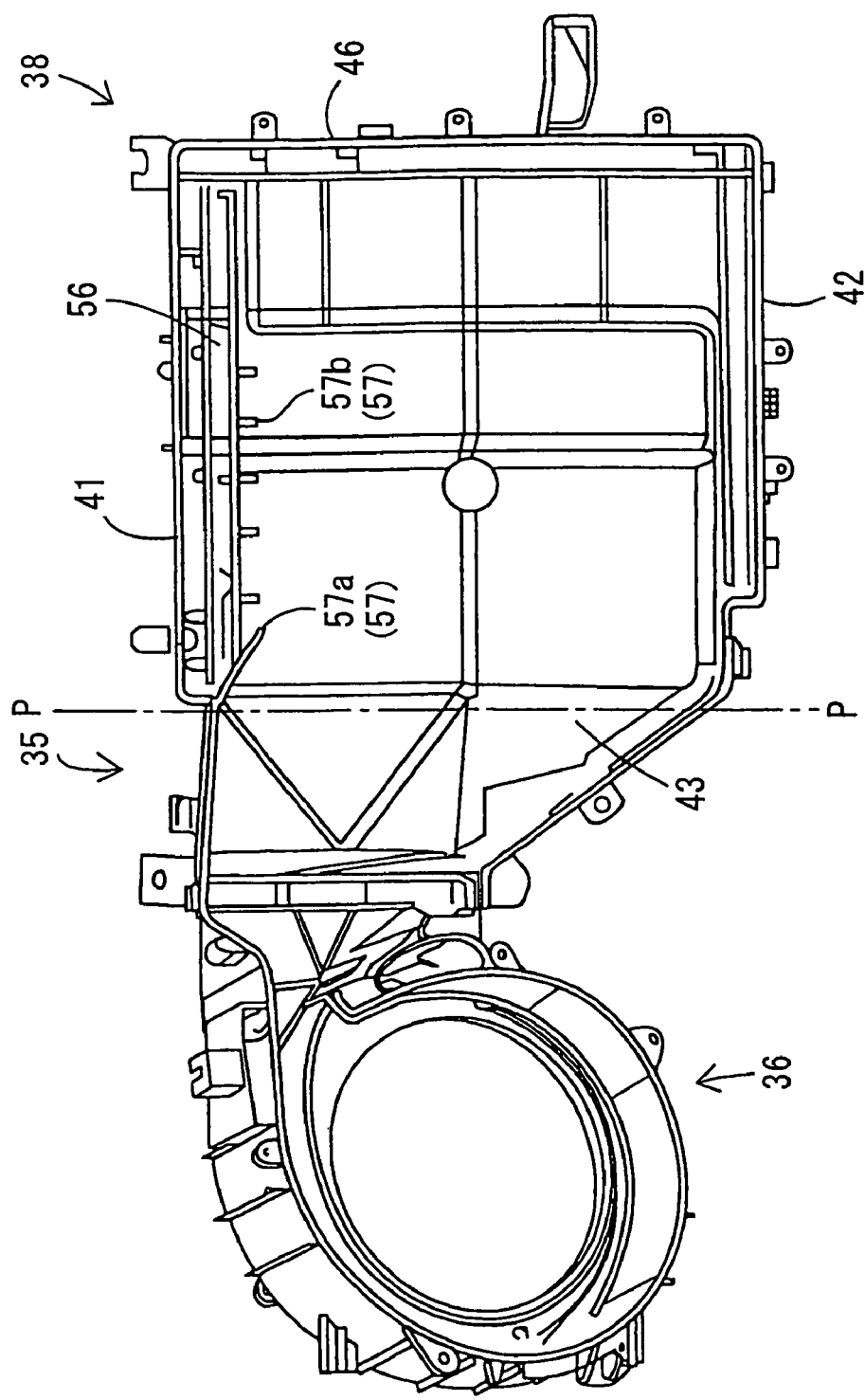
FIG. 2 is a schematic perspective view showing a lower case part of the vehicle air conditioner in FIG. 1.

The lower case part 35 shown in FIG. 2 is made of resin, and includes a blower containing portion 36 and an evaporator containing portion 38. A blower (not shown) is contained in the blower containing portion 36 having a round shape, and blows air toward the evaporator 48 from a side of the evaporator 48. The blower blows air to the right side in FIG. 2, where the evaporator 48 is located.

The evaporator containing portion 38 has an approximately rectangular bottom wall portion 39 (see FIG. 4), a pair of side wall portions 41, 42 and an end wall portion 46 (flow turning portion). The evaporator containing portion 38 has an opening at an upper end. An air introducing port 43 is formed and defined by the bottom wall portion 39 and the side wall portions 41, 42. The side wall portions 41, 42 extend in a direction parallel with a flow direction of air from the air introducing port 43. That is, the side wall portions 41, 42 extend in a direction parallel with an air introducing direction from the air introducing port 43. One end portion 49a (e.g., left end in FIG. 1) of the evaporator 48 is supported by a step portion formed in the side wall portion 42, and the other end portion 49b (e.g., right end in FIG. 1) is supported by the side wall portion 41. The evaporator 48 is located between both the side walls 41, 42 to be slanted and to form a space 36 under the evaporator 48 within the lower case part 35. That is, the evaporator 48 is arranged such that the one end portion 49a approximately parallel with the air introducing direction becomes higher and the other end portion 49b approximately parallel with the air introducing direction becomes lower. Air blown from the blower flows into the space 36 under the evaporator 48 in a direction perpendicular to the plan P including the air introducing port 43. Plural tubes (not shown) of the evaporator 48 can be arranged to extend in a slanted direction of the evaporator 48.

Figure 3:
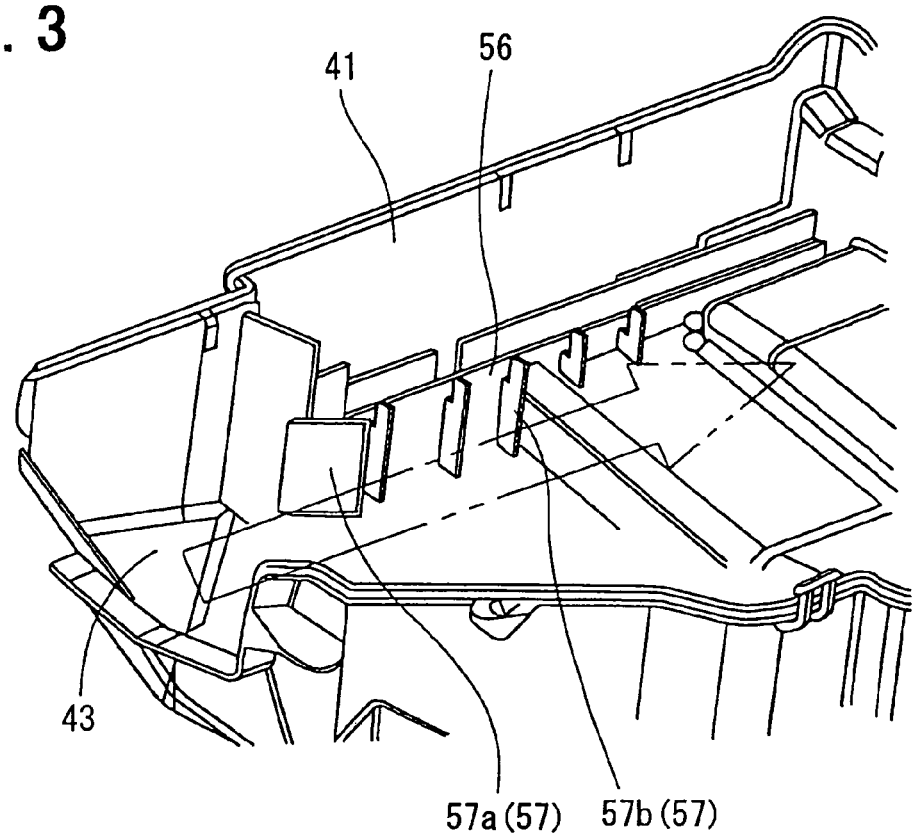
FIG. 3 is a perspective view showing a guide portion for guiding condensed water in the lower case part.
Figure 4:
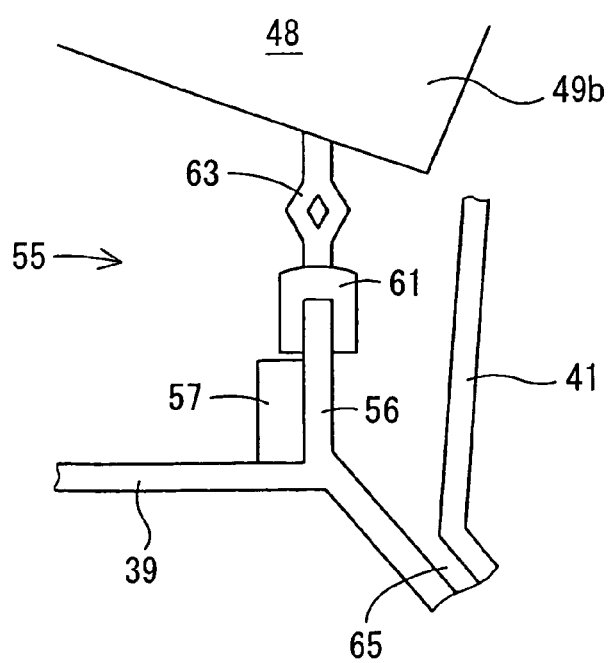
FIG. 4 is a schematic diagram showing the guide portion and a plate member for reducing a flow rate of air in the lower case part.

As shown in FIGS. 3 and 4, a guide portion 55 for guiding condensed water is arranged between the lower end portion 49b of the evaporator 48 and the bottom wall portion 39 of the lower case part 35. The guide portion 55 is constructed with a protruding rib 56 extending along an entire length (left right length in FIG. 2) of the evaporator 48, a resin portion 61 attached to the protruding rib 56 and a rubber portion 63 integrated with the resin portion 61. A contact portion which contacts the bottom surface of the lower end portion 49b of the evaporator 48 is constructed with the resin portion 61 and the rubber portion 63. Here, one end portion (i.e., rubber portion 63) of the contact portion contacts the lower end portion 49b, and the other end portion (i.e., resin portion 61) of the contact portion is engaged with the protruding rib 56. Therefore, each of the resin portion 61 and the rubber portion 63 is formed into a longitudinal shape extending in the extending direction of the protruding rib 56.

As shown in FIG. 3, the protruding rib 56 extends in the air introducing direction from the air introducing port 43. Plural ribs 57 are formed on a side surface of the protruding rib 56 integrally with the protruding rib 56 at a predetermined interval. The ribs 57 are composed of a most upstream rib 57a protruding from the side surface of the protruding rib 56 to be slanted from the side surface of the protruding rib 56, and the other ribs 57b except for the most upstream rib 57a. The most upstream rib 57a is slanted such that the protruding end of the most upstream rib 57a is positioned at a downstream side relative to the base portion of the most upstream rib 57a. Furthermore, a drain port 65 through which condensed water from the surface of the evaporator 48 is discharged to an exterior of the air conditioning case 10 is formed at a corner portion between the bottom wall portion 39 of the lower case part 35 and the side wall portion 41.

Next, operation of the vehicle air conditioner will be described.

When a defroster mode is set, the air mixing door 33 and the auxiliary air mixing door 28 are rotated at positions, the defroster door 21 is rotated to open the defroster opening 17, and the face door 22 and the foot door 23 are rotated to close the face opening 18 and the foot opening 19. Therefore, mixed air of the warm air from the heater core 27 and the cool air from the evaporator 48, having a suitable temperature, is blown toward the windshield from the defroster opening 17 during the defroster mode.

During the defroster mode, air blown by the blower is cooled in the evaporator 48, and is heated in the heater core 27 so that conditioned air having a suitable temperature is blown toward the windshield through the defroster opening 17. Condensed water generated on the surface of the evaporator 48 flows toward the lower end portion 49b of the evaporator 48 along the slanted bottom surface, and is discharged to the exterior from the drain port 65 of the lower case part 35.

When a cooling mode is set, cool air is generally blown toward the upper side of a passenger in the passenger compartment from the face opening 18. That is, when the cooling mode is set, the air mixing door 33 and the auxiliary air mixing door 28 are rotated at positions so that air cooled in the evaporator 48 flows toward the face opening 18. FIG. 1 shows a maximum cooling state in the cooling mode. Further, when the cooling mode is set, the face door 22 is rotated to open the face opening 18, and the defroster door 21 and the foot door 23 are rotated to close the defroster opening 17 and the foot opening 19. Accordingly, during the face mode, air blown by the blower is cooled in the evaporator 48, and is blown into the passenger compartment from the face opening 22.

Similarly to the defroster mode, during the cooling mode, condensed water generated on the surface of the evaporator 48 flows toward the lower end portion 49b of the evaporator 48 along the slanted surface, and is discharged to the exterior from the drain port 65 of the lower case part 35.

When a heating mode is set, warm air is generally blown toward the lower side of a passenger in the passenger compartment from the foot opening 19. During the heating mode, the air mixing door 33 and the auxiliary air mixing door 28 are rotated so that air from the evaporator 48 is heated in the heater core 27. Furthermore, the foot door 23 is rotated to open the foot opening 19, the defroster door 21 and the face door 22 are rotated so that the defroster opening 17 is partially opened and the face opening 18 is completely closed.

Accordingly, during the heating mode, conditioned air, heated in the heater core 27 and having a suitable temperature, is blown from both the defroster opening 17 and the foot opening 19.

According to this embodiment of the present invention, air from the blower is blown toward the space 36 of the evaporator receiving portion 38 at the right side in FIG. 2, and is turned upwardly by the end wall portion 46 of the lower case part 35. Therefore, air passes through the evaporator 48 upwardly from below. In this embodiment, the air passage is formed in the evaporator 48 above the lower end portion 49b, and the heater core 27 is arranged above the evaporator 48 at the side of the upper end portion 49a. Therefore, the flow speed of air flowing through the evaporator 48 is faster at the side of the lower end portion 49b of the evaporator 48, than the flow speed of air at the side of the upper end portion 49a.

In this embodiment, however, the flow speed of air flowing in parallel with the support portion (side wall portions 41, 42 of the lower case part 35 in FIG. 2) of the evaporator 48 is decreased by the ribs 57 positioned under the lower end portion 49b of the evaporator 48. Therefore, the flow speed (upward flow speed) of air after being turned by the end wall portion 46 is also decreased at the side of the lower end portion 49b of the evaporator 48.

In this embodiment, because the guide portion 55 is formed, condensed water generated on the evaporator 48 and collected at the lower end portion 49b is guided by the guide portion 55, and is discharged to the exterior through the drain port 65. In addition, the protruding rib 56 extends in a direction parallel to the introducing direction of air introducing from the air introducing port 43, and the ribs 57 used as a plate member are formed to protrude from the side surface of the protruding rib 56 of the guide portion 55 in a direction crossing with or/and approximately perpendicular to the air introducing direction. Therefore, the flow speed of air introduced from the air introducing port 43 and flowing along the side surface of the protruding rib 56 of the guide portion 55 is decreased. As a result, even when the flow amount of air blown from the blower is high, it can prevent the condensed water from being largely scattered due to the air flow.

Furthermore, the most upstream rib 57a is slanted such that the protruding end of the most upstream rib 57a is positioned at a downstream air side than the base portion of the most upstream rib 57a. Therefore, the most upstream rib 57a prevents the flow speed of air from being excessively decreased. The ribs 57 can be formed integrally with the protruding rib 56. In this case, the ribs 57 can be easily formed.

In this embodiment, when a large amount of air flows in the air passage above the lower end portion 49b of the evaporator 48 as in FIG. 1, the effect of the guide portion 55 including the ribs 57 can be more effectively improved. Furthermore, the tubes of the evaporator 48 can be arranged to extend in the slanting direction of the evaporator 48. In this case, draining performance of the condensed water can be further improved.

OTHER EMBODIMENTS

Although the present invention has been described in connection with some preferred embodiments thereof with reference to the accompanying drawings, it is to be noted that various changes and modifications will become apparent to those skilled in the art.

For example, in the above-described embodiment, the heater core 27 is arranged above the evaporator 48 and both the air mixing door 33 and the auxiliary air mixing door 28 are provided for adjusting the temperature of air to be blown into the passenger compartment. However, the arrangement structure of the heater core 27 and doors 32, 28 can be suitably changed without being limited to the above-described structure. For example, the heater core 27 can be arranged above the evaporator 48 at the side of the lower end portion 49b of the evaporator 48, and a flow rate of air passing through the heater core 27 can be adjusted by using a single air mixing door.

The evaporator 48 may be constructed with a laminated type structure, or a serpentine type structure. Furthermore, the tubes of the evaporator 48 can be arranged to extend in the air introducing direction from the air introducing port 43 or can be arranged to extend in a direction perpendicular to the air introducing direction.

In the above-described embodiment, the air conditioning case 10 is constructed with the upper case part 11 and the lower case part 35. However, only when the evaporator containing portion 38 is provided, the division structure of the air conditioning case 10 can be arbitrarily changed.

In the above-described embodiment, the contact portion for coupling the protruding rib 57 to the lower end portion 49b of the evaporator 48 is constructed with the rubber member 63 and the resin member 61. However, the structure of the contact portion can be arbitrarily changed only when one end of the contact portion contacts the lower end portion 49b of the evaporator 48 and the other end of the contact portion is engaged with the protruding rib 56. Furthermore, the materials and the shapes of the rubber member 63 and the resin portion 61 can be suitably changed without being limited to the above-described embodiment. Alternatively, the protruding rib 56 may extend from the bottom wall portion 39 to contact the lower end portion 49b. That is, the protruding rib 56 and the contact portion (61, 63) can be constructed with a simple plate member.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. An air conditioner for a vehicle, comprising:
a cooling heat exchanger which cools air passing therethrough; and
an air conditioning case in which the cooling heat exchanger is arranged to be slanted, the air conditioning case having an air introducing port from which air is introduced in an air introducing direction from a side of the cooling heat exchanger to a space under the cooling heat exchanger, wherein,
the air conditioning case includes a flow turning portion by which air introduced from the air introducing port into the space under the cooling heat exchanger is turned and flows through the cooling heat exchanger upwardly, and
the cooling heat exchanger is slanted to have an upper end portion and a lower end portion approximately parallel to the air introducing direction, the air conditioner further comprising
a plate member arranged in the air conditioning case at a position under the lower end portion of the cooling heat exchanger, wherein the plate member has a plate surface, which crosses with the air introducing direction to reduce a flow speed of air;
a blower for blowing air, the air conditioning case including a blower containing portion for accommodating the blower; the blower containing portion including an air blowing outlet from which air is blown out to the air introducing port, the air blowing outlet being located at a side of the air conditioning case where the plate member is arranged, under the lower end portion of the cooling heat exchanger.

2. The air conditioner according to claim 1, wherein the plate surface of the plate member is approximately perpendicular to the air introducing direction.

3. An air conditioner for a vehicle, comprising:
a cooling heat exchanger which cools air passing therethrough; and
an air conditioning case in which the cooling heat exchanger is arranged to be slanted, the air conditioning case having an air introducing port from which air is introduced in an air introducing direction from a side of the cooling heat exchanger to a space under the cooling heat exchanger, wherein,
the air conditioning case includes a flow turning portion by which air introduced from the air introducing port into the space under the cooling heat exchanger is turned and flows through the cooling heat exchanger upwardly, and
the cooling heat exchanger is slanted to have an upper end portion and a lower end portion approximately parallel to the air introducing direction, the air conditioner further comprising
a plate member arranged in the air conditioning case at a position under the lower end portion of the cooling heat exchanger, wherein the plate member has a plate surface, which crosses with the air introducing direction to reduce a flow speed of air;
a drain port portion provided in a bottom wall portion of the air conditioning case, through which condensed water generated on the cooling heat exchanger is discharged to an exterior of the air conditioning case; and
a guide portion through which the condensed water collected at the lower end portion of the cooling heat exchanger is guided to the drain port portion,
wherein the guide portion includes a protruding portion protruding from the bottom wall portion of the air conditioning case and integrated with the plate member, and a contact portion having a first end engaged with the protruding portion and a second end contacting a bottom surface of the lower end portion of the cooling heat exchanger.

4. The air conditioner according to claim 3, wherein the protruding portion extends in a direction parallel to the air introducing direction.

5. The air conditioner according to claim 1, wherein:
the plate member includes a plurality of ribs having at least an upstream rib and a downstream rib positioned downstream of the upstream rib in the air introducing direction; and
the upstream rib is arranged to have a low flow resistance as compared with the downstream rib.

6. An air conditioner for a vehicle, comprising:
a cooling heat exchanger which cools air passing therethrough; and
an air conditioning case in which the cooling heat exchanger is arranged to be slanted, the air conditioning case having an air introducing port from which air is introduced in an air introducing direction from a side of the cooling heat exchanger to a space under the cooling heat exchanger, wherein,
the air conditioning case includes a flow turning portion by which air introduced from the air introducing port into the space under the cooling heat exchanger is turned and flows through the cooling heat exchanger upwardly, and
the cooling heat exchanger is slanted to have an upper end portion and a lower end portion approximately parallel to the air introducing direction, the air conditioner further comprising
a plate member arranged in the air conditioning case at a position under the lower end portion of the cooling heat exchanger, wherein the plate member has a plate surface, which crosses with the air introducing direction to reduce a flow speed of air; wherein:
the plate member includes a plurality of ribs having at least an upstream rib and a downstream rib positioned downstream of the upstream rib in the air introducing direction;
the upstream rib is arranged to have a low flow resistance as compared with the downstream rib;
the upstream rib is slanted toward downstream in the air introducing direction; and
the downstream rib protrudes approximately perpendicular to the air introducing direction.

7. The air conditioner according to claim 1, wherein the cooling heat exchanger is arranged in the air conditioning case such that a flow speed of air flowing upward in the cooling heat exchanger is higher at the lower end portion, as compared with the upper end portion of the cooling heat exchanger.

8. The air conditioner according to claim 1, wherein the plate member is formed integrally with the bottom wall portion of the air conditioning case.

9. The air conditioner according to claim 1, wherein the cooling heat exchanger includes a plurality of tubes extending in a slanted direction of the cooling heat exchanger.

10. An air conditioner for a vehicle, comprising:
a cooling heat exchanger which cools air passing therethrough; and
an air conditioning case in which the cooling heat exchanger is arranged to be slanted, the air conditioning case having an air introducing port from which air is introduced in an air introducing direction from a side of the cooling heat exchanger to a space under the cooling heat exchanger, wherein,
the air conditioning case includes a flow turning portion by which air introduced from the air introducing port into the space under the cooling heat exchanger is turned and flows through the cooling heat exchanger upwardly, and
the cooling heat exchanger is slanted to have an upper end portion and a lower end portion approximately parallel to the air introducing direction, the air conditioner further comprising
a plate member arranged in the air conditioning case at a position under the lower end portion of the cooling heat exchanger, wherein the plate member has a plate surface, which crosses with the air introducing direction to reduce a flow speed of air;
a protruding portion protruding from a bottom wall portion of the air conditioning case toward the lower end portion of the cooling heat exchanger at a portion under the lower end portion, wherein:
the protruding portion extends in the air introducing direction; and
the plate member includes a plurality of ribs integrated with the protruding portion at intervals.

11. The air conditioner according to claim 10, wherein the ribs have a most upstream rib slanted toward downstream in the air introducing direction, and the other ribs except for the most upstream rib have surfaces approximately perpendicular to the air introducing direction.

12. The air conditioner according to claim 1, wherein the plate member extends from the air conditioning case into the space under the cooling heat exchanger, the air blown by the blower being blown directly onto the plate surface of the plate member.

* * * * *